May 10, 1938.  A. H. ACKERSON  2,116,651
TONGS
Filed Feb. 17, 1936
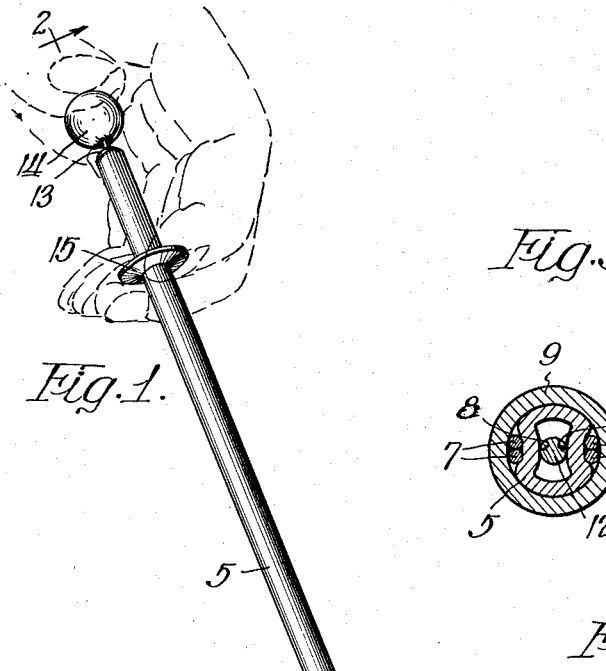
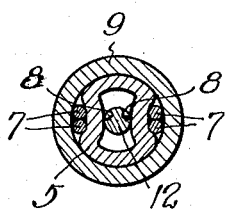
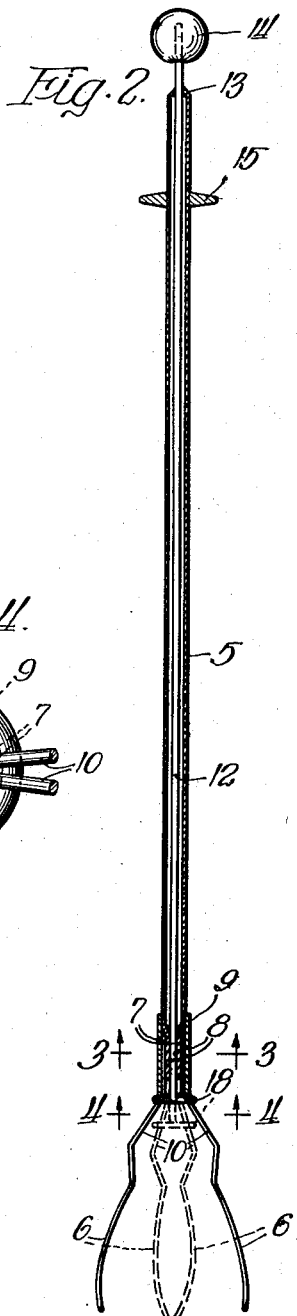
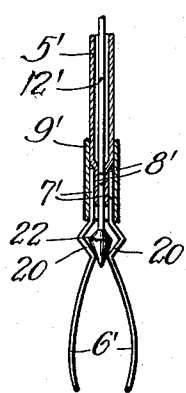
Inventor:
Alfred H. Ackerson Patented May 10, 1938

2,116,651

UNITED STATES PATENT OFFICE 2,116,651

TONGS

Alfred H. Ackerson, Chicago, Ill., assignor to Utili-Tong, Inc., Chicago, Ill., a corporation of Illinois Application February 17, 1936, Serial No. 64,259

5 Claims. (Cl. 294—100)

This invention relates to tongs and similar implements for grasping and handling objects, and has to do with tongs for grasping and picking up olives, cherries, and other articles of similar nature and size, and for removing such articles from bottles, jars, or other containers.

One of the main objects of my invention is to provide a tongs device which is adapted for picking up and handling articles of this sort expeditiously and without piercing or otherwise injuring the same.

It is also an object of my invention to provide a tongs device of simple and inexpensive construction, and which may be handled and operated conveniently and effectively; also a device composed of few parts and adapted for convenient assembly, and a device which does not require pivoting of the tong members or pivotal connections for operating the same.

Further objects and advantages of my invention will appear from the following detailed description, taken in connection with the accompanying drawing, in which:

Figure 1 is a perspective view of one form of tongs embodying the present invention, showing the same in operation, with a cherry engaged thereby;

Figure 2 is a longitudinal section taken on the line 2—2 of Figure 1;

Figure 3 is an enlarged sectional view taken on the line 3—3 of Figure 2;

Figure 4 is an enlarged sectional view taken on the line 4—4 of Figure 2; and

Figure 5 is a fragmentary longitudinal section showing a modification.

Referring now in detail to the drawing, the tongs shown in Figures 1 to 4, inclusive, comprises a body portion formed of an elongated metal tube 5 which may be finished as desired.

The two tong members 6, 6 are formed of spring wire, such as music wire or the like. The wire forming each tong member 6 is bent in the general form of a U, with the ends 7 brought together and pressed and held securely in place in indentations 8 in the adjacent end of the tube 5 by an outside bushing 9 having pressed fit upon the end of the tube 5. The ends 7 of the wires forming the tong members 6 may be dipped in acid, solder, and water to hold these ends together during assembly. The bushing 9 holds the ends 7 of the tong members 6 rigidly to the adjacent end of the tube 5.

Outwardly of the adjacent end of the tube 5 and bushing 9 the tong members 6 have diverging portions 10 for a purpose which will presently appear, and beyond these portions 10 the tong members are of the shape shown, or of other suitable or preferred shape for gripping and handling the cherry, olive, or other article in the manner shown in Figure 1, or in an equivalent manner.

A plunger consisting of a stem 12 is operable longitudinally in the tube 5, and extends at opposite ends from the opposite ends of the tube. One end of the tube 5 is turned in at 13 slidingly to support the adjacent end of the stem 12 without a cap device or the like. The adjacent extending end of the stem 12 is provided with a button 14 for manipulating the stem in the manner shown in Figure 1. The button 14 is preferably formed to simulate the article adapted to be handled by the tongs, as, for example, a cherry as shown, although this may vary widely within the scope of the present invention.

Pressed over the tubular body portion 5 and rigidly secured at a convenient distance from the upper end thereof is an annular flange or finger-piece 15. This flange is engaged by the fingers of the operator in the manner shown in Figure 1 for providing a grip upon the tongs when it is desired to depress the button 14 for manipulating the tong members 6.

The opposite extending end of the stem 12 is bent in the form of an eye 18 which encircles the adjacent portions of the tong members 6. The tube 5 is of small diameter, and the indentations 8 may form guides for slidingly guiding the adjacent end of the stem 12.

In the operation of the device, the tong members 6 are placed over the article to be gripped, whereupon the opposite end of the device is grasped, as shown in Figure 1, and the button 14 depressed. This moves the stem 12 longitudinally through the tube 5 toward the end at which the tong members 6 are disposed, and the eye 18, cooperating with the diverging portions 10 of the tong members, closes the tong members about the article, thereby grasping the same so that it may be picked up and handled. The resilient character of the tong members 6 returns said tong members to open position to release the article when the plunger or stem 12 is released. The resilient character of the tong members, by means of the cooperation of the diverging portions 10 with the eye 18, also returns the stem 12 to the position from which it was actuated in closing the tong members upon the article.

In the modification shown in Figure 5, the tong members 6' are formed of spring wire, as before, and their ends 7' are brought together and pressed and held securely in place in indentations 8' in the adjacent end of the tube 5' by an outside bushing 9' having pressed fit upon the end of the tube 5'. The upper end of this device is substantially similar to that shown in the embodiment of Figures 1 to 4, inclusive.

In the embodiment of Figure 5, however, the tong members 6' have converging portions 20, and the lower end of the operating stem 12' has a wedge member 22 engageable with the converging portions 20 when the stem 12' is depressed to spread the tong members 6' from their normally closed position to open position to receive the article to be gripped. The button at the upper end of the stem 12' is then released and the tong members, due to their resilient character, spring to closed position and grip the article so that it may be picked up and handled. The article is released from the tongs by merely depressing the button at the upper end of the stem 12' sufficiently to release the article.

I do not intend to be limited to the precise details shown or described.

I claim:

1. Tongs of the class described comprising a hollow tubular body member of generally cylindrical cross section, the walls at one end of said body member being turned generally inwardly, a plunger disposed within said hollow body member and extending therefrom at both ends of the body member, the plunger being guided at said one end by virtue of said turned-in wall portions, wall portions at the other end of said hollow body member being indented longitudinally of the body member and at diametrically opposite sides thereof, the indented wall portions of the body member being spaced apart to receive the lower end of said plunger, spring members seated in said diametrically opposite indented portions of the hollow body member, and means carried at the lower end of said plunger and engaging said spring members for controlling the position thereof.

2. Tongs of the class described comprising a hollow tubular body member of generally cylindrical cross section, the walls at one end of said body member being turned generally inwardly, a plunger disposed within said hollow body member and extending therefrom at both ends of the body member, the plunger being guided at said one end by virtue of said turned-in wall portions, wall portions at the other end of said hollow body member being indented longitudinally of the body member and at diametrically opposite sides thereof, the indented wall portions of the body member being spaced apart to receive the lower end of said plunger, spring members seated in said diametrically opposite indented portions of the hollow body member, means carried at the lower end of said plunger and engaging said spring members for controlling the position thereof, and a generally cylindrical bushing having an internal diameter substantially the same as the internal diameter of the tubular body member pressed over the indented end of the body member to connect said spring members rigidly to the body member.

3. Tongs of the class described comprising a hollow tubular body member of generally cylindrical cross section, a plunger disposed within said hollow body member and extending therefrom at both ends of the body member, wall portions at one end of said hollow body member being indented longitudinally of the body member and at diametrically opposite sides thereof, the indented wall portions of the body member being spaced apart to receive the lower end of said plunger, a pair of looped spring wire members, each having its ends brought together, the ends of one loop member being disposed in one of the indentations of the body member and the ends of the other loop member being disposed in the diametrically opposite indentation, a bushing disposed about the lower end of the body member for fixing the pair of wire ends in said indentations, and means carried at the lower end of said plunger and cooperating with the latter in controlling the position of said loop members.

4. Tongs of the class described comprising a hollow tubular body member of generally cylindrical cross section, a plunger disposed within said hollow body member and extending therefrom at both ends of the body member, wall portions at the lower end of said hollow body member being indented longitudinally of the body member and at diametrically opposite sides thereof, the indented wall portions of the body member being spaced apart to receive the lower end of said plunger, a pair of looped spring wire members, each having its ends brought together, the ends of one loop member being disposed in one of the indentations of the body member and the ends of the other loop member being disposed in the diametrically opposite indentation, and a generally circular loop embracing said spring members and fastened to the lower end of said plunger, the indented wall portions at the lower end of the body member serving to guide the lower end of the plunger and the loop encircling the spring members so that manipulation of the plunger shifts each spring member approximately the same amount.

5. Tongs of the class described comprising a hollow tubular body member of generally cylindrical cross section, a plunger disposed within said hollow body member and extending therefrom at both ends of the body member, wall portions at the lower end of said hollow body member being indented longitudinally of the body member and at diametrically opposite sides thereof, the indented wall portions of the body member being spaced apart to receive the lower end of said plunger, a pair of looped spring wire members, each having its ends brought together, the ends of one loop member being disposed in one of the indentations of the body member and the ends of the other loop member being disposed in the diametrically opposite indentation, a bushing disposed about the lower end of the body member for fixing the pairs of wire ends in said indentations, and a generally circular loop embracing said spring members and fastened to the lower end of said plunger, the indented wall portions at the lower end of the body member serving to guide the lower end of the plunger and the loop encircling the spring members so that manipulation of the plunger shifts each spring member approximately the same amount, the portions of said looped members diverging outwardly from the lower end of the body member and the plunger-carried loop being disposed by the bias of said spring members normally against the lower end of said bushing.

ALFRED H. ACKERSON.